Patented Aug. 27, 1946

2,406,465

UNITED STATES PATENT OFFICE 2,406,465

TITANIUM OXIDE PIGMENT PRODUCTION

John Lewis Keats, Wilmington, Del., assignor to E. I. du Pont de Nemours & Company, Wilmington, Del., a corporation of Delaware No Drawing. Application January 9, 1942, Serial No. 426,251

17 Claims. (Cl. 23—202)

This invention relates to the production of pigment-useful titanium compounds, and more particularly to the manufacture of titanium oxide pigments in substantially the rutile crystalline form.

More specifically, the invention pertains to novel methods for obtaining highly improved rutile titanium oxide pigments, by conversion of anatase, through treatment of said anatase at elevated calcination temperatures, in the presence of a precipitated titanium-oxygen compound which acts as a rutile conversion promoter.

Titanium oxide on X-ray analysis reveals three $TiO_2$ crystalline modifications—anatase, brookite and rutile, the respective indices of refraction of which are 2.52, 2.65 and 2.71. Anatase and rutile comprise the forms which are most adaptable and useful for pigment purposes. Rutile raw pigment may be precipitated upon hydrolysis of titanium chloride solutions while anatase raw pigment precipitates upon hydrolysis of titanium sulfate solutions. After being subjected to the usual purification and washing treatments, calcination of the raw pigment precipitate, at temperatures in excess of about 750° C. (and usually from about 850–1000° C.), develops its essential pigmentary properties and provides the final $TiO_2$ pigment.

Although anatase has the lowest $TiO_2$ refractive index and rutile the highest refractive index (and consequently the greatest potential hiding power), most present-day commercial $TiO_2$ pigments are in the anatase modification. The main reason for this is that anatase production entails procedures which are more economical and attractive for commercial exploitation. For instance, titanium sulfate solutions may be readily obtained from the sulfuric acid attack or dissolution of titaniferous ores, such as ilmenite. These solutions are less corrosive toward plant equipment than the highly corrosive titanium chloride solutions from which rutile is derived. Furthermore, rutile processes require an extremely difficult and carefully controlled type of operation, which, with its accompanying corrosion and related problems, presents an extremely expensive, less economical type of process, thereby rendering such processes less attractive for wide commercial adaptation in $TiO_2$ production.

When hydrous titanium oxide, such as is precipitated in commercial processes from the hydrolysis of titanium sulfate solutions, is calcined in the temperature range of from about 950° C. to about 1000° C., high quality titanium oxide pigments in the anatase crystal form are usually produced. If the calcination is carried out at a higher temperature, ranging to from, say 1025° C. to 1050° C., or above, the resulting products are in substantially the rutile crystal form. Many processes contemplating such type of anatase to rutile conversion by high temperature calcination already exist. In such instances, however, the potentially higher hiding power and tinting strength of the higher refractive index modification are not realized. The use of these excessive temperatures causes sintering, grit and aggregate formation and this results in objectionable particle size growth which is decidedly disadvantageous to satisfactory $TiO_2$ pigment production. As a consequence, the resulting product is often wholly unfit for many intended uses, especially in coating compositions, such as paints, enamels and lacquers, wherein the pigment must possess satisfactory color, brightness and texture, as well as high tinting strength and hiding power.

It is among the objects of this invention to overcome these and other difficulties and disadvantages characterizing prior rutile pigment production, and to provide novel procedures for obtaining an improved form of rutile pigment having completely satisfactory color or whiteness characteristics, together with other equally satisfactory and essential physical properties such as texture and brightness, high tinting strength, hiding power, and desired smallness and uniformity of particle size. Particular objects of the invention include the provision of a novel method for obtaining an improved, relatively insoluble, durable, weather-resistant rutile pigment, having the above and other essential characteristics, by adding to an anatase hydrolysate a separately prepared precipitated titanium-oxygen compound adapted to promote or induce the conversion of said anatase to rutile at a temperature below that normally required to convert anatase to rutile. Another object is to provide a process for preparing rutile $TiO_2$ pigments which overcomes the disadvantages arising by reason of prior high temperature conversion processes. Other objects and advantages will be evident from the ensuing description of the invention.

These and other objects are attainable in this invention which embodies the discovery that an excellent rutile pigment results from anatase conversion, if the anatase, and particularly a precipitated, hydrated form thereof, is subjected to calcination in the presence of an added, separately prepared titanium-oxygen compound precipitate which may be either in rutile crystal form or in the form of an anatase having a rutile conversion temperature below that of commercially produced anatase.

In a more specific and preferred embodiment, the invention comprises obtaining an improved rutile titanium oxide pigment by calcining a precipitated, hydrous form of anatase TiO₂ at a temperature within a range which is normally employed in producing pigment anatase, after admixing with the previously prepared anatase hydrolysate a relatively small amount of a rutile conversion promoter, comprising precipitated, raw rutile titanium oxide.

In one practical and preferred adaptation, relatively pure, washed anatase raw pigment, such as is prepared from the hydrolysis of a titanium sulfate solution in accordance with, for example, the commercial processes described in U. S. Reissue Patents 18,854 or 18,790, admixed with a small amount, say, from about 2% to 10% of separately prepared titanium oxide which has been precipitated in the rutile crystalline form. Said rutile conversion promoter may comprise the hydrolysate resulting from the hydrolysis of a titanium chloride solution, in accordance with, for example, the procedures outlined in U. S. Patent 2,062,133. Seeding of the anatase may be conveniently effected by blending with the seed material while in aqueous suspension, following which agitation of the resulting suspension is resorted to in order to effect intimate and thorough admixture of the TiO₂ particles with each other, and then filtering to remove excess water. The resulting pigment cake then may be dewatered by drying, if desired, or, if preferred, may be fed as a wet paste into a conventional type of calciner, such as a rotary or muffle type of furnace, and the seeded mixture calcined under substantially atmospheric pressure at temperatures ranging from about 900° C. to 1000° C., or at such temperature that the final calcined product, upon X-ray analysis, is substantially completely in the rutile crystalline form. Calcination treatment for a time period ranging from about 1 to 2 or 3 hours at the indicated temperatures will usually suffice to develop all essential pigmentary properties and substantially completely convert the TiO₂ to rutile. After completing the calcination treatment, the calciner discharge is conventionally cooled and is then ground, either in wet or dry condition, to desired pigment fineness.

In order to illustrate the invention more particularly, the following specific examples are given, it being understood that said examples are not to be considered as placing any limitations or restrictions upon the herein-described invention:

Example I

A raw rutile product for seeding anatase raw pigment was prepared by hydrolysis of titanium chloride solution obtained by dilution of the redistilled commercial anhydrous product. The hydrolysis was conducted according to the following conditions. Seed was prepared by precipitating orthotitanic acid by neutralizing, with NH₄OH to a pH of 6.0, a TiCl₄ solution obtained by diluting the redistilled commercial anhydrous product. The precipitate was washed free of electrolyte and peptized by slurrying to a concentration of 30 grams TiO₂ per liter and 0.3 normal with respect to HCl and heating the suspension at 80° C. for 20 minutes. The sol thus formed was added to the TiCl₄ solution to be hydrolyzed in an amount equivalent to 3% on the TiO₂ basis and the concentration of the seeded solution adjusted to 110 grams TiO₂ per liter. Powdered zinc was added to reduce 0.5% of the titanium ions in solution to the trivalent state. The solution was heated quickly to 95° C. by injection of live steam and immersion of the container in a boiling water bath and was then held at 95° C. to 98° C. for 30 minutes. Sulfuric acid equivalent to 15% of the weight of the TiO₂ was added to the suspension as a 50% solution. After standing several hours, the suspension was filtered and the cake washed until the washings showed no test for sulfate ions with BaCl₂. The washed precipitate, hereafter designated as raw rutile, was slurried with water to a concentration of 200 grams TiO₂ per liter.

Relatively pure anatase raw pigment, produced by the hydrolysis of titanium sulfate in accordance with U. S. Reissue Patent 18,854, was then mixed with the above raw rutile seeding agent, in the ratio one part rutile to ten parts anatase by weight of TiO₂. The resulting mixture was filtered, dried and calcined in a rotary furnace at 950° C. for 30 minutes. The calcined product was substantially all rutile (98%). A sample of the same anatase raw pigment, but containing no raw rutile seed, showed no conversion to rutile even after calcination at 1000° C. The strength and color of the seeded product calcined at 950° C. were distinctly superior to rutile pigments obtained by calcining the unseeded anatase raw pigment at temperatures above 1000° C.

Example II

Anatase raw pigment from the same source as that referred to in Example I was desulfated by neutralizing a slurry to a pH of 6.8 to 7.0 with NH₄OH and washing out the sulfate ions. The desulfated anatase raw pigment was mixed with rutile raw pigment, prepared under the conditions outlined in Example I, in the ratio of one part rutile to three parts anatase. The mixture was then calcined in a rotary furnace at 950° C. for 30 minutes. The product was determined to be entirely converted to the rutile crystal form and had tinting strength of 168 compared with 150 for commercial anatase. A like sample of the desulfated anatase raw pigment with no seed present showed no conversion to rutile even after calcination at 1000° C.

The above tinting strength values were determined in accordance with the method described by J. E. Booge and H. E. Eastlack in the Paint, Oil and Chemical Review, dated April 16, 1924.

The invention has been illustrated in connection with certain specific and preferred embodiments thereof, entailing the use of specific titanium compounds or hydrolysates and particular conditions, amounts, ratios and temperatures of calcination, etc. Obviously, it is not to be construed as limited thereto since variance therefrom may be had without departing from its underlying spirit and scope.

As will be evident, the invention is generally applicable to all types of anatase titanium oxide in order to promote or accelerate its conversion to substantially rutile during calcination or recalcination treatment. It is highly useful for treating precipitated anatase raw pigment obtained from the hydrolysis of titanium sulfate solutions and for converting said anatase to rutile through calcination by addition, prior to said calcination, of a relatively small amount of a different form of titanium hydrate, especially raw rutile, which functions as a promoter or accelerates the desired rutile conversion at temperatures which are normally employed for developing essential anatase TiO₂ pigment properties, e. g., from about 750° C. to 1000° C.

Although my preferred form of seeding agent comprises precipitated raw rutile pigment, prepared from the hydrolysis of titanium chloride or nitrate solutions, other types of seeding agents, some of which are not in the rutile but are in substantially the anatase form when precipitated, may be similarly usefully employed. The important feature of any such non-rutile seeding agent is that when calcined alone, it converts to rutile at temperatures lower than that at which the main anatase raw pigment under treatment converts when it is calcined alone. That is, because of its inherent nature or condition, the rutile promoter readily converts to rutile at temperatures below 1000° C. and preferably within a range of from about 600 to about 900° C., as distinguished from normal anatase raw pigment which usually requires temperatures in excess of 1000° C. and of the order of above 1100° C. before any substantial or complete conversion to rutile can be detected upon X-ray examination. Other useful forms of rutile promoters comprise the raw pigments resulting from the hydrolysis procedures disclosed in the co-pending applications Ser. No. 283,052, filed July 6, 1939, and Ser. No. 283,051, filed July 6, 1939, in which I appear as co-inventor with Henry M. Stark. Such raw pigments, because of their inherent ease of conversion to rutile, may be employed as rutile promoters when admixed with the usual separately prepared anatase precipitates or already calcined or pigment developed anatase. Also utilizable as rutile seeding agents are the reduced raw TiO₂ pigment products obtained from the mechanical dispersion of titanium oxide raw pigment to reduce secondary particle size, as contemplated more particularly in the co-pending application, Ser. No. 426,250, filed January 9, 1942, in which I appear as co-inventor with James H. Peterson.

While I prefer to incorporate the rutile seeding agent into the original raw pigment by intermixing aqueous slurries of each, whereby intimate association of the two TiO₂ components results by mixing hydrolysates which remain substantially wet from the time of precipitation to admixture, dry mixing of the seeding agent with the anatase may be resorted to.

Although I preferably employ in my preferred procedure rutile and anatase mixed in the ratio of from about 2–10 parts of rutile per 100 parts of anatase, this range may be extended, and if desired may comprise from about 1–25 parts of rutile per 100 parts of anatase.

From the foregoing, it will be apparent that the invention is especially suitable for promoting conversion of anatase TiO₂ hydrolysates obtained from the commercial process described in U. S. Reissue Patent 18,854, and that it is equally applicable to the treatment and conversion of raw pigment anatase generally resulting from the hydrolysis or neutralization of titanium salts, especially titanium sulfate solutions. Similarly, it may be applied to the treatment and conversion of the hydrolysate resulting from the processes described in U. S. Reissue Patent 18,790. Although precipitated anatase, obtained from the hydrolysis of titanium salt solutions, comprises a preferred form of product for treatment and conversion in accordance with my invention, treatment is also contemplated of a previously calcined or pigment-developed anatase, in accordance with my invention, to obtain a converted form of rutile TiO₂.

While calcination temperatures ranging from substantially 900–1000° C. have been suggested as useful herein, these are merely preferred, since they more readily enable one to obtain optimum results hereunder. The use of any particular calcination temperature will depend upon the character of the titanium oxide under treatment, the particular pigment properties desired to be developed in the final product, and the extent of rutile crystallinity which such product is to exhibit. As stated, the use of the indicated preferred 900–1000° C. temperature range will afford optimum results under the invention for the production of a finished product substantially completely in the rutile crystalline form. However, lower temperatures down to, say, 750 or 800° C., may be used, if desired, and hence are contemplated. In such instances, however, the extent of rutile conversion will be found to decrease, especially if relatively small amounts of the seeding catalyst are present during the heat treatment.

Again, while the invention has been described as adapted particularly for the production of so-called straight or unextended forms of titanium oxide pigments, it is also equally applicable to the production of extended forms of such pigments. Thus, I contemplate the production of titanium oxide pigments extended with the various inorganic compounds, such as barium sulfate, calcium sulfate, calcium carbonate, magnesium or other silicates, etc., either precipitated upon or blended with the titanium oxide during its manufacture, processing or finishing.

As will be evident, the invention affords production of a finished, fully-developed titanium oxide pigment converted to the desire rutile crystalline form without the necessity of resorting to the undesirably high temperatures heretofore required in obtaining prior converted rutile pigments. The improved nature of the pigment of this invention is evident when the fact is considered that the avoidance of the high conversion temperatures previously required prevents any objectionable sintering from occurring and adversely affecting the color, uniformity, particle size, texture, tinting strength and hiding power of the ultimate pigment. Pigments obtained by calcining at an excessively high temperature are characteristically coarse and gritty in nature and, prior to use, must be subjected to prolonged grinding treatments in an effort to reduce to some degree the aggregates formed during such sintering. By this invention, this additional disadvantage is completely eliminated and a direct process is provided in lieu thereof for obtaining an inherently soft and smooth-textured pigment having excellent tinting strength, hiding power and color, together with complete freedom from objectionable sintered aggregates or coarse particles.

The titanium oxide products prepared according to my invention will be useful in all fields in which white titanium oxide pigments are employed, as, for instance, in interior and exterior coating compositions, such as paints, enamels, lacquers, etc., in linoleum and similar products, in paper, rubber compounding, in delustering rayon and other artificial silk materials, and in various other fields. Because of its relatively high hiding power and pigment density, my rutile product will be found to be particularly useful wherever formulations are required which employ relatively low pigment volume.

I claim as my invention:

1. A process for obtaining a rutile titanium oxide pigment through calcination and conversion of anatase, which comprises admixing with previously prepared anatase $TiO_2$ a minor amount of a separately prepared titanium-oxygen compound rutile promoter which when calcined alone at a temperature not in excess of substantially 900° C., exhibits substantially the X-ray diffraction pattern of rutile, and then calcining the resulting mixture at a temperature sufficient to develop the pigment properties thereof but not exceeding about 1000° C.

2. A process for obtaining a rutile titanium oxide pigment through conversion of anatase by calcination at a relatively low conversion temperature, comprising calcining said anatase after separate preparation, in the presence of a minor amount of separately prepared hydrous raw rutile promoter, and effecting said calcination at a temperature ranging from about 750° C. to not exceeding about 1000° C.

3. A process for obtaining a rutile titanium oxide pigment which comprises subjecting a separately precipitated raw anatase titanium oxide to calcination at a temperature ranging from about 750° C. to not exceeding substantially 1000° C. after admixture with an added, minor amount of a rutile conversion promoter, comprising a precipitated titanium-oxygen compound which exhibits the rutile X-ray diffraction pattern when calcined alone at temperatures not in excess of substantially 1000° C.

4. A process for obtaining a rutile titanium oxide pigment through calcination conversion of anatase which comprises subjecting a mixture of raw pigment anatase and a minor amount of added, precipitated raw pigment rutile to calcination at a temperature ranging from substantially 750–1000° C. until the pigment properties thereof become developed and said anatase becomes converted to rutile.

5. A process for obtaining an improved rutile titanium oxide pigment which comprises converting precipitated raw anatase to rutile by calcining the same at a temperature ranging from substantially 900–1000° C. after mixing therewith a separately prepared rutile conversion catalyst, comprising a small amount of an added, precipitated and uncalcined, raw rutile pigment.

6. A process for obtaining an improved rutile titanium oxide pigment which comprises converting precipitated raw pigment anatase recovered from the hydrolysis of a titanium sulfate solution to rutile by calcining said anatase at a temperature ranging from about 900–1000° C., in the presence of from about 2–10 parts of added, separately prepared uncalcined, precipitated raw rutile per 1000 parts of the anatase.

7. A process for obtaining an improved rutile titanium oxide pigment which comprises converting precipitated raw pigment anatase recovered from the hydrolysis of a titanium salt solution to rutile by calcining said anatase at a temperature ranging from about 800–1000° C. in the presence of from about 1–25 parts of added, separately prepared uncalcined, precipitated raw rutile per 100 parts of anatase.

8. A process for producing an improved rutile titanium oxide pigment which comprises subjecting a $TiO_2$ mixture, comprising from about 2 to 10 parts of added, separately prepared uncalcined, precipitated raw rutile pigment per 100 parts of precipitated raw anatase pigment recovered from the hydrolysis of a titanium sulfate solution, to calcination at a temperature of substantially 950° C. for about 30 minutes.

9. A process for producing an improved rutile titanium oxide pigment which comprises calcining at a temperature ranging from about 750° C.–1000° C. an anatase hydrolysate after admixing with a separately prepared minor amount of a rutile conversion promoter, comprising a separately precipitated raw pigment titanium oxide compound which exhibits the rutile crystalline pattern when calcined alone at a substantially lower temperature than the major titanium oxide component undergoing calcination treatment.

10. A process for obtaining a rutile titanium oxide pigment by conversion of anatase comprising calcining at temperatures ranging from about 800 to 1000° C. an anatase hydrolysate after mixing with a minor amount of an added separately precipitated titanium-oxygen compound, which when calcined alone at temperatures ranging from about 600–900° C. exhibits substantially the X-ray diffraction pattern of rutile.

11. In a process for the production of rutile titanium dioxide pigment from anatase titanium dioxide, the steps comprising calcining at temperatures ranging from about 750–1000° C. an intimate mixture of separately prepared titanium oxides, the major component of the $TiO_2$ mixture being in the anatase crystal form and making up the larger percentage of said mixture, while the minor component present in a lesser percentage is added thereto in the uncalcined condition and is characterized by showing the rutile X-ray diffraction pattern upon calcination alone at a substantially lower temperature than is required to develop the rutile X-ray diffraction pattern for the major component.

12. A process for obtaining an improved rutile titanium oxide pigment through conversion of anatase which comprises intimately mixing in aqueous suspension previously-washed purified raw pigment anatase recovered from the hydrolysis of a titanium sulfate solution, with separately-prepared raw pigment rutile recovered from the hydrolysis of a titanium chloride solution, employing in said mixture from about 2–10 parts of rutile per 100 parts of anatase, filtering said suspension to remove excess water therefrom, and then calcining the recovered raw pigment mixture at temperatures ranging from about 900–1000° C. to develop the pigment properties thereof and effect complete conversion of said anatase to rutile.

13. The method of producing rutile titanium dioxide pigment which comprises hydrolyzing a titanium salt solution normally yielding anatase titanium dioxide upon hydrolysis under such conditions that the hydrolysate formed can be converted to rutile titanium dioxide upon calcination at a temperature not exceeding 1000° C., admixing at least 1 part of said uncalcined hydrolysate with 100 parts of a second titanium salt solution hydrolysate consisting of anatase titanium dioxide, and calcining the resulting mixture at a temperature not exceeding 1000° C.

14. A method for the conversion of precipitated titanium dioxide having the crystal structure of anatase, and normally calcining to anatase, to titanium dioxide having the crystal structure of rutile, which comprises calcining the titanium dioxide having the crystal structure of anatase in the presence of separately prepared titanium dioxide having the crystal structure of rutile, added after precipitation, the calcination being carried out at a temperature not exceeding about 1000° C.

15. A method for the conversion of precipitated titanium dioxide having the crystal structure of anatase, and normally calcining to anatase, to titanium dioxide having the crystal structure of rutile, which comprises calcining the titanium dioxide having the crystal structure of anatase in the presence of separately prepared hydrated titanium dioxide precipitate having the crystal structure of rutile, added after precipitation, the calcination being carried out at a temperature not exceeding about 1000° C.

16. A method for the conversion of precipitated titanium dioxide having the crystal structure of anatase, and normally calcining to anatase, to titanium dioxide having the crystal structure of rutile, which comprises calcining the titanium dioxide having the crystal structure of anatase in the presence of separately prepared hydrated titanium dioxide which shows a definite rutile crystal structure upon calcination at a relatively low temperature, added after precipitation, the calcination being carried out at a temperature not exceeding about 1000° C.

17. A method for the conversion of precipitated titanium dioxide having the crystal structure of anatase, and normally calcining to anatase, to titanium dioxide having the crystal structure of rutile, which comprises calcining the titanium dioxide having the crystal structure of anatase in the presence of a raw pigment substance selected from the group consisting of separately-prepared titanium dioxide having the crystal structure of rutile and separately-prepared hydrated titanium dioxide which shows a definite rutile crystal structure upon calcination at a relatively low temperature, added after precipitation, the calcination being carried out at a temperature not exceeding about 1000° C.

JOHN LEWIS KEATS.

Certificate of Correction

Patent No. 2,406,465.  August 27, 1946.

JOHN LEWIS KEATS

It is hereby certified that error appears in the printed specification of the above numbered patent requiring correction as follows: Column 7, line 57, claim 6, for "1000 parts" read *100 parts*; and that the said Letters Patent should be read with this correction therein that the same may conform to the record of the case in the Patent Office.

Signed and sealed this 29th day of October, A. D. 1946.

[SEAL]

LESLIE FRAZER,
*First Assistant Commissioner of Patents.*